US 3,644,562
Patented Feb. 22, 1972

3,644,562
NICKEL DIMERISATION CATALYSTS
John Robert Jones, Walton-on-Thames, and Thomas J. Symes, Twickenham, England, assignors to The British Petroleum Company Limited, London, England
No Drawing. Filed Dec. 5, 1968, Ser. No. 781,632
Claims priority, application Great Britain, Dec. 28, 1967, 58,824/67
Int. Cl. C07c 3/10
U.S. Cl. 260—683.15 D    10 Claims

ABSTRACT OF THE DISCLOSURE

Linear dimers having an internal double bond are prepared by dimerising an alpha-mono-olefin containing $C_3$-$C_6$ carbon atoms per molecule in the presence of a nickel complex of diisobutyrylmethane or dibenzoylmethane and an aluminium alkyl activating agent.

---

This invention relates to a process for the production of dimers of alpha-olefins, particularly linear dimers.

Processes for the dimerisation of alpha olefins in the presence of aluminium alkyls, either as the sole catalytic entity or in combination with a minor proportion of an activator, are known.

British patent specification No. 713,081—Ziegler discloses a process for the polymerisation of ethylene which comprises contacting ethylene at a temperature within the range 60°–250° C. with an activator selected from hydrides of aluminium, gallium, indium and beryllium and derivatives of such hydrides in which one or more of the hydrogen atoms are substituted by hydrocarbon radicals selected from the group consisting of alkyl radicals and monovalent aromatic hydrocarbon radicals.

In particular, British patent specification No. 713,081 discloses the polymerisation of ethylene to butene-1 and higher linear alpha-olefins by contacting ethylene with aluminium triethyl at 200°–220° C. under super-atmospheric pressure.

British patent specification No. 742,642—Ziegler discloses a process for the dimerisation of a mono-olefin containing more than two carbon atoms in the molecule which comprises heating the monoolefin at a temperature within the range 60°–250° C. in the presence of an activator selected from the hydrides of beryllium, aluminium, gallium and indium and derivatives of such hydrides in which one or more of the hydrogen atoms are substituted by hydrocarbon radicals selected from the group consisting of alkyl radicals and mono-valent aromatic hydrocarbon radicals.

In particular British patent specification No. 742,642 discloses the dimerisation of propylene to a product consisting predominantly of 2-methylpentene-1 by contacting propylene with aluminum triethyl at temperatures in the range 180°–240° C. under super-atmospheric pressure. British patent specification No. 773,536—Ziegler discloses a process for the catalytic polymerisation of ethylene to form butene, hexene or high liquid or solid paraffin-like polymers or mixtures thereof in the presence of an aluminium trialkyl of general formula

wherein $R_1$, $R_2$ and $R_3$ represent similar or dissimilar alkyls, in which the aluminium trialkyl is activated by nickel, cobalt or platinum.

In particular British patent specification 773,536 discloses the polymerisation of ethylene to butene-1 and higher linear alphaolefins by contacting ethylene with aluminum triethyl and a minor proportion of nickel acetyl acetonate at 100° C. The advantage of the process described in British patent specification 773,536 with respect to prior art processes, e.g. 713,081, is stated to lie in the fact that it can be effected at much lower temperature.

One would therefore expect that the dimerisation of an alpha-olefin, for example propylene, in the presence of a catalyst comprising an activating agent, for example an aluminium trialkyl and a complex nickel compound, for example nickel acetyl acetonate, would result in the production of a product consisting predominantly of branched chain olefins, for example 2-methylpentene-1, and that this process could be effected at lower temperatures than those disclosed in British patent specification 742,642.

Copending U.S. application Ser. No. 558,588, now Pat. No. 3,483,268, discloses a process for the production of a product consisting predominantly of linear dimers having an internal double bond which process comprises dimerising an alpha-olefin containing at least three carbon atoms in the presence of a catalyst comprising a complex organic compound of a metal of Group VIII of the Periodic Table according to Mendeleef and an activating agent, the molar ratio of the Group VIII compound to activating agent being in the range 2:1 to 0.1:1 at a temperature in the range −40° C. to +200° C., under such conditions of pressure that the reactants are maintained in the liquid or partially condensed phase.

Dimerising an alpha-olefin in the presence of a catalyst comprising a relatively large proportion of the complex organic compound and the activating agent results in the production of a product which consists predominantly of linear dimers having an internal double bond.

Such linear dimers are suitable for use in the manufacture of bio-degradable detergents.

We have now discovered that increased yield of dimer can be obtained by using the nickel complex of di-isobutyrylmethane or dibenzoylmethane and an aluminium alkyl as the Group VIII complex compound and activating agent respectively.

Thus according to the present invention there is provided a process for the production of a product consisting predominantly of linear dimers having an internal double bond which process comprises dimerising an alpha olefin in the presence of a nickel complex of di-isobutyrylmethane or dibenzoylmethane and an aluminium alkyl activating agent at a temperature in the range −40° to +200° C. under such conditions of pressure that the reactants are maintained in the liquid or partially condensed phase.

By the term activating agent we mean a compound which when mixed with a complex organic compound of Group VIII of the Periodic Table according to Mendeleef produces a catalyst mixture having a polymerisation activity greater than that of the complex Group VIII compound alone. It is pointed out that British Pat. No. 773,536 uses a reverse terminology in that it refers to aluminium trialkyls which are within the scope of our term "activating agent" as being "activated by" compounds falling within the scope of our term "complex organic compound of Group VIII of the Periodic Table according to Mendeleef."

By the term dimerisation we mean in a $C_3$ to $C_6$ alpha-mono-olefin feedtsock the union of two molecules of the same olefin or the union of one molecule of one olefin with one molecule of a different olefin to produce a linear dimer having an internal double bond. Thus the reaction sometimes termed codimerisation is within the scope of the term dimerisation as used in this specification.

The catalyst components are preferably mixed in the presence of an olefin, which may or may not be the olefin to be dimerised, as disclosed in co-pending U.S. application Ser. No. 693,101, now Pat. No. 3,505,425. More preferably the catalyst components are mixed in the presence of the olefin to be dimerised.

The mixing of the components may be effected by (i) pre-mixing the olefin feed with the activating agent and then mixing with a solution of the complex compound in or just before entering the reaction zone, (ii) pre-mixing the complex compound solution with the olefin feed and mixing with the activating agent in or just before entering the reaction zone or (iii) mixing all three components at once where the activating agent and the complex compound are retained separate in thin walled vessels until these are burst by the pressure of the olefin feed. In a continuous flow process it is convenient to pump in the three components separately at the required rates taking care that either the activating agent or complex compound is introduced into the feed stream last.

The temperature at which the catalyst compounds are mixed is suitably less than 100° C., preferably in the range 0–40° C.

Preferably the catalyst components are dissolved or dispersed in organic liquids before being mixed with one another.

Suitable liquids include normally liquid ethers, hydrocarbons and halogenated hydrocarbons. The preferred diluents are aromatic and halogenated aromatic compounds, e.g., benzene, toluene, xylene and chlorobenzene, and ethers e.g. tetrahydrofuran and diethylene-glycol dimethyl ether. The organic liquids act as solvents for both components of the catalyst and thus produce a homogeneous catalyst system which is of increased reproducible activity when compared with heterogeneous systems.

Dimerisation is then effected in the presence of the catalyst dispersion or solution.

Preferably the moisture content of the complex nickel compound is reduced to below 3% by weight before use. In general, the lower the moisture content the better.

The preferred aluminium alkyl activating agents are aluminium alkyl alkoxides. The preferred aluminium alkyl alkoxide is aluminium diethyl ethoxide. Aluminium trialkyls, e.g. aluminium triethyl are also suitable.

Aluminium dialkyl alkoxides are preferred because they react gently with the complex organic compound and catalysts of consistent quality are obtained in successive preparations. Some other activating agents, e.g., aluminium trialkyls, react more vigorously and render temperature control of the catalyst preparation reaction more difficult. As a result, it is more difficult to obtain catalysts of consistent quality. Nevertheless, useful catalysts are obtained from such agents.

The preferred olefins for dimerisation contain 3–6 carbon atoms per molecule.

Particularly preferred olefins include propylene and butene-1.

The pressure to be employed should be sufficient to maintain the olefin at least partially in the liquid phase. For normally liquid olefins, the pressure may be atmospheric.

The molar ratio of the complex nickel compound to the activating agent is suitably in the range 2:1 to 0.1:1. In the case of aluminium diethylethoxide and other metal dialkyl compounds the preferred ratio is 1.0:0.8 to 1:2. The preferred range for trialkyl aluminium compounds such as aluminium triethyl is 1.0:0.5 to 1:1.5, while for monoalkyl compounds such as aluminium ethyldiethoxide the preferred range is 1.0:1.5 to 1:4.

The catalyst must be preserved from contact with water, oxygen alcohols, acids, amines, phosphines, sulphur compounds, dienes, acetylenes, carbon monoxide and other complexing ligands which displace olefins from transition metal complexes. The presence of substantial quantities of these materials will destroy or reduce the efficiency of the catalyst.

The catalytic activities of nickel acetyl acetonate, nickel dibenzoylmethane and nickel di-isobutyrylmethane are shown in the following six examples. Examples 5 and 6 are included for comparative purposes only.

EXAMPLE 1

The nickel complex of dibenzoylmethane (2.5 g.) which had been dried in a vacuum oven 100° C. was dissolved in 50 ml. dry diglyme (diethyleneglycol dimethyl ether). The solution was transferred under dry nitrogen to a 1 litre stainless steel autoclave. Also placed in the autoclave was a thin walled glass flask containing 5 ml. of a 1.0 M solution of aluminium diethylethoxide in toluene. The autoclave was sealed, warmed to 40° C. and pressurised with dry liquid propylene to 600 p.s.i. The autoclave was rocked for 17 hours maintaining the temperature at 40° C.

The contents of the autoclave were then vented into chilled (solid carbon dioxide-acetone) flasks. Unreacted propylene was allowed to evaporate to room temperature leaving a liquid product consisting of catalyst residues and olefin polymers. The polymers consisted of 162 g. hexenes of which 77.0 percent was linear hexenes and 33 g. higher molecular weight polymers, mainly nonenes. This corresponds to a catalyst activity of about 2300 g. polymer/mole nickel complex/hour.

EXAMPLE 2

The method of Example 1 was repeated using the same weights of materials except that a 3-litre autoclave was employed and the reaction time was increased to 90 h., maintaining a temperature of 40° C. and a pressure of 600 p.s.i.

The polymer was found to consist of 256 g. hexenes of which 76.2 percent was linear hexenes and 54 g. higher molecular weight polymer. The total productivity of the catalyst was, therefore, about 62,000 g. polymer/mole nickel complex.

EXAMPLE 3

The nickel complex of di-isobutyrylmethane was dried in a vacuum oven at 100° C. Part of this complex (1.9 g.) was dissolved in 50 ml. dry toluene and transferred under dry nitrogen to a 1-litre stainless steel autoclave. Also placed in the autoclave was a thin walled glass flask containing 5 ml. of a 1.0 M solution of aluminium diethylethoxide in toluene. The autoclave was sealed, warmed to 40° C. and pressurised with dry liquid propylene to 600 p.s.i. The autoclave was rocked for 17 hours maintaining the temperature at 40° C.

Products were collected as in Example 1 and the liquid polymer formed was found to consist of 187 g. hexenes of which 78.5 percent was linear hexenes and 53 g. higher molecular weight polymer, mainly nonenes. This corresponds to a catalyst activity of about 2800 g. polymer/mole nickel complex/hour.

EXAMPLE 4

The method of Example 3 was repeated except that only 1.0 g. of the nickel complex of di-isobutyrylmethane was used dissolved in 50 ml. toluene and only 3.0 ml. of the 1.0 M solution of aluminium diethylethoxide in toluene was used; a 3-litre autoclave was employed and the reaction time was increased to 90 hours maintaining temperature at 40° C. and pressure at 600 p.s.i.

The polymer was found to consist of 155 g. hexenes of which 77.6 percent was linear hexenes and 47 g. nonenes and other higher molecular weight polymers. The total productivity of the catalyst, therefore, was about 77,000 g. polymer/mole nickel complex.

EXAMPLE 5

Nickel acetylacetonate (1.3 g.) which had been dried in a vacuum oven at 100° C. was dissolved in 50 ml. dry toluene and transferred under dry nitrogen to a 1-litre stainless steel autoclave. Also placed in the autoclave was a thin-walled glass flask containing 5 ml. of a 1.0 M solution of aluminium diethylethoxide in toluene. The autoclave was sealed, warmed to 40° C. and pressurised with dry liquid propylene to 600 p.s.i. The autoclave was rocked for 17 hours maintaining the temperature at 40° C.

Products were collected as in Example 1 and the liquid polymer formed was found to consist of 19 g. hexenes of which 77.5 percent was linear hexenes, and 31 g. higher molecular weight polymer, mainly nonenes. This corresponds to a catalyst activity of about 1760 g. polymer/mole nickel complex/hour.

EXAMPLE 6

The method of Example 5 was repeated using the same quantities of materials except that a 3-litre autoclave was used and the reaction time was increased to 90 hours maintaining a temperature of 40° C. and a pressure of 600 p.s.i.

The polymer was found to consist of 248 g. hexenes of which 75.2 percent was linear hexenes and 43 g. higher molecular weight polymers. The total productivity of the catalyst, therefore, was about 58,000 g. polymer/mole nickel complex.

Examples 1, 3 and 5 show the relative activities of the catalysts over a 17 hour period and Examples 2, 4 and 6 show the relative productivities after 90 hours, when the catalysts were considered to be completely deactivated.

What we claim is:

1. A process for the production of a product consisting predominantly of linear dimers having an internal double bond which process comprises dimerising a $C_3$ to $C_6$ alpha mono-olefin in the presence of a catalyst selected from the group consisting of a nickel complex of di-isobutyryl methane and a nickel complex of dibenzoyl methane and further containing an aluminium alkyl activating agent selected from the group consisting of aluminium trialkyl and aluminium alkyl alkoxide, the molar ratio of the complex nickel compound to the activating agent being in the range 2:1 to 0.1:1, said dimerising being at a temperature in the range of —40° to +200° C. and under such conditions of pressure that the reactants are maintained in the liquid or partially condensed phase.

2. A process according to claim 1 in which the temperature is in the range 0° to 40° C.

3. A process according to claim 1 wherein the aluminium alkyl activating agent is an aluminium alkyl alkoxide.

4. A process according to claim 3 wherein the aluminium alkyl alkoxide activating agent is an aluminium dialkyl monoalkoxide.

5. A process according to claim 4 wherein the aluminium dialkyl monoalkoxide is aluminium diethyl ethoxide.

6. A process according to claim 4 wherein the molar ratio of the complex nickel compound to the aluminium dialkyl monoalkoxide activating agent is in the range of 1.0:0.8 to 1:2.

7. A process according to claim 3 wherein the aluminium alkyl alkoxide activating agent is an aluminium monoalkyl dialkoxide.

8. A process according to claim 7 wherein the molar ratio of the complex nickel compound to the aluminium monoalkyl dialkoxide activating agent is in the range of 1.0:1.5 to 1:4.

9. A process according to claim 1 wherein the aluminium alkyl activating agent is an aluminium trialkyl.

10. A process according to claim 9 wherein the molar ratio of the complex nickel compound to the aluminium trialkyl activating agent is 1.0:0.5 to 1:1.5.

References Cited

UNITED STATES PATENTS

| | | | |
|---|---|---|---|
| 2,781,410 | 2/1957 | Ziegler et al. | 260—683.15 |
| 3,483,268 | 12/1969 | Hambling et al. | 260—683.15 |
| 3,243,467 | 3/1966 | Zuech | 260—683.15 X |
| 3,306,948 | 2/1967 | Kealy | 260—680 |
| 3,355,510 | 11/1967 | Cannell et al. | 260—683.15 |
| 3,364,278 | 1/1968 | Reusser | 260—683.15 |
| 3,390,201 | 6/1968 | Drew | 260—676 |

PAUL M. COUGHLAN, Jr., Primary Examiner

U.S. Cl. X.R.

252—431 C

UNITED STATES PATENT OFFICE
CERTIFICATE OF CORRECTION

Patent No. 3,644,562      Dated February 22, 1972

Inventor(s) John Robert Jones and Thomas James Symes

It is certified that error appears in the above-identified patent and that said Letters Patent are hereby corrected as shown below:

Column 5, line 5, please change "19 g. hexenes" to -- 119 g. hexenes --

Signed and sealed this 13th day of June 1972.

(SEAL)
Attest:

EDWARD M. FLETCHER, JR.
Attesting Officer

ROBERT GOTTSCHALK
Commissioner of Patents